(12) United States Patent
Tezuka et al.

(10) Patent No.: US 12,181,314 B2
(45) Date of Patent: Dec. 31, 2024

(54) OPTICAL FIBER CHARACTERISTIC MEASUREMENT DEVICE AND OPTICAL FIBER CHARACTERISTIC MEASUREMENT METHOD

(71) Applicant: Yokogawa Electric Corporation, Tokyo (JP)

(72) Inventors: Shin-ichirou Tezuka, Musashino (JP); Masayoshi Honma, Musashino (JP); Satoshi Matsuura, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 281 days.

(21) Appl. No.: 17/775,788

(22) PCT Filed: Nov. 20, 2020

(86) PCT No.: PCT/JP2020/043327
§ 371 (c)(1),
(2) Date: May 10, 2022

(87) PCT Pub. No.: WO2021/111894
PCT Pub. Date: Jun. 10, 2021

(65) Prior Publication Data
US 2022/0381589 A1 Dec. 1, 2022

(30) Foreign Application Priority Data
Dec. 4, 2019 (JP) ................................ 2019-219379

(51) Int. Cl.
*G01D 5/353* (2006.01)
*G01K 11/322* (2021.01)
*G01M 11/00* (2006.01)

(52) U.S. Cl.
CPC ....... *G01D 5/35364* (2013.01); *G01K 11/322* (2021.01); *G01M 11/30* (2013.01)

(58) Field of Classification Search
CPC .. G01D 5/35364; G01K 11/322; G01M 11/30
See application file for complete search history.

(56) References Cited

U.S. PATENT DOCUMENTS

2007/0053626 A1 3/2007 Takei et al.
2011/0032517 A1* 2/2011 Hotate ................. G01M 11/334
356/73.1

(Continued)

FOREIGN PATENT DOCUMENTS

CN 110470327 A 11/2019
JP 5105302 B2 * 12/2012

(Continued)

OTHER PUBLICATIONS

JP5105302B2 English Machine translation (Year: 2012).*

*Primary Examiner* — Dominic J Bologna
(74) *Attorney, Agent, or Firm* — RANKIN, HILL & CLARK LLP

(57) ABSTRACT

An optical fiber characteristic measurement device (1, 2, 3) includes a photodetector (15, 15A) which detects Brillouin scattered light (LS) obtained by causing light to be incident on an optical fiber (FUT), an intensity acquisitor (16, 16A) which acquires a signal intensity at a prescribed reference frequency (f1, f2) from a detection signal (S1, S2, S3) output from the photodetector, and a measurer (18, 18A, 18B) which measures characteristics of the optical fiber by obtaining a peak frequency of a Brillouin gain spectrum, which is a spectrum of the Brillouin scattered light, from the signal intensity at the reference frequency acquired by the intensity acquisitor.

18 Claims, 7 Drawing Sheets

(56) References Cited

U.S. PATENT DOCUMENTS

| | | | |
|---|---|---|---|
| 2011/0228255 A1* | 9/2011 | Li | G01B 11/18 |
| | | | 356/32 |
| 2017/0016801 A1* | 1/2017 | Nikles | G01M 5/0091 |
| 2019/0072417 A1* | 3/2019 | Khadour | G01L 1/242 |

FOREIGN PATENT DOCUMENTS

| | | |
|---|---|---|
| JP | 2016-148661 A | 8/2016 |
| WO | 2005/028995 A1 | 3/2005 |
| WO | 2010/061718 A1 | 6/2010 |

* cited by examiner

OPTICAL FIBER CHARACTERISTIC MEASUREMENT DEVICE AND OPTICAL FIBER CHARACTERISTIC MEASUREMENT METHOD

TECHNICAL FIELD

The present invention relates to an optical fiber characteristic measurement device and an optical fiber characteristic measurement method.

BACKGROUND ART

An optical fiber characteristic measurement device is a device for measuring a temperature distribution or a distortion distribution in a length direction of a measurement target optical fiber, vibration of the measurement target optical fiber, or other characteristics by causing continuous light or pulsed light to be incident on the measurement target optical fiber and detecting scattered light or reflected light generated in the measurement target optical fiber. In this optical fiber characteristic measurement device, since detected scattered light or reflected light changes according to a physical quantity (for example, temperature or distortion) that affects the measurement target optical fiber, the measurement target optical fiber itself can be used as a sensor.

One of such optical fiber characteristic measurement devices is a device of a Brillouin optical correlation domain reflectometry (BOCDR) method. The optical fiber characteristic measurement device of the BOCDR method causes pump light that is frequency-modulated continuous light to be incident on one end of the measurement target optical fiber, and detects light in which Brillouin scattered light emitted from the one end of the measurement target optical fiber and reference light (light that is frequency-modulated similarly to the pump light) are interfered. Then, characteristics of the measurement target optical fiber are measured by obtaining a spectrum of the Brillouin scattered light (hereinafter referred to as "Brillouin gain spectrum") from an obtained detection signal and obtaining a frequency shift amount of the Brillouin scattered light (hereinafter referred to as "shift amount of the Brillouin frequency") with respect to incident light.

In the optical fiber characteristic measurement device of the BOCDR type, the Brillouin scattered light at a specific position at which a "correlation peak" appears in the measurement target optical fiber is selectively extracted by causing interference between the Brillouin scattered light and the reference light. Here, the correlation peak can be moved in a length direction of the measurement target optical fiber by sweeping modulation frequencies of the pump light and the reference light. Therefore, a temperature distribution or a distortion distribution in a length direction of the measurement target optical fiber can be measured by obtaining the shift amount of the Brillouin frequency at a position at which each correlation peak appears while moving the correlation peak. For details of the optical fiber characteristic measurement device of the BOCDR type, refer to, for example, Patent Literature 1 below.

CITATION LIST

Patent Literature

Patent Literature 1

Japanese Patent No. 5105302

SUMMARY OF INVENTION

Technical Problem

Incidentally, the shift amount of the Brillouin frequency obtained by the above-described optical fiber characteristic measurement device of the BOCDR type indicates a difference between a frequency of the incident light and a peak frequency of the Brillouin gain spectrum. Therefore, in order to obtain the shift amount of the Brillouin frequency, it is necessary to obtain the Brillouin gain spectrum and then obtain a peak frequency thereof. Here, since it is necessary to perform a frequency sweep of the detection signal to obtain the Brillouin gain spectrum, there is a problem that a measurement time becomes long.

The present invention has been made in view of the above circumstances, and an objective of the present invention is to provide an optical fiber characteristic measurement device and an optical fiber characteristic measurement method capable of measuring characteristics of a measurement target optical fiber in a shorter period of time.

Solution to Problem

In order to solve the above-described problem, an optical fiber characteristic measurement device (1, 2, 3) according to one aspect of the present invention includes a photodetector (15, 15A) which detects Brillouin scattered light (LS) obtained by causing light to be incident on an optical fiber (FUT), an intensity acquisitor (16, 16A) which acquires a signal intensity at a prescribed reference frequency (f1, f2) from a detection signal (S1, S2, S3) output from the photodetector, and a measurer (18, 18A, 18B) which measures characteristics of the optical fiber by obtaining a peak frequency of a Brillouin gain spectrum, which is a spectrum of the Brillouin scattered light, from the signal intensity at the reference frequency acquired by the intensity acquisitor.

Also, in the optical fiber characteristic measurement device according to one aspect of the present invention, the reference frequency is a frequency within a frequency band of a reference Brillouin gain spectrum obtained in a state in which the optical fiber is placed under a prescribed reference environment.

Also, in the optical fiber characteristic measurement device according to one aspect of the present invention, the reference frequency is a frequency at which an inclination of the reference Brillouin gain spectrum is the largest.

Also, in the optical fiber characteristic measurement device according to one aspect of the present invention, the reference frequency is two frequencies sandwiching the peak frequency of the reference Brillouin gain spectrum.

Also, the optical fiber characteristic measurement device according to one aspect of the present invention includes a storage (18a) which stores conversion information for converting the signal intensity at the reference frequency into the peak frequency of the Brillouin gain spectrum, and the measurer uses the conversion information stored in the storage to obtain the peak frequency of the Brillouin gain spectrum from the signal intensity at the reference frequency acquired by the intensity acquisitor.

Also, the optical fiber characteristic measurement device according to one aspect of the present invention includes a light source (11) which outputs frequency-modulated continuous light (L1), a first optical branching part (12) which branches the continuous light into pump light (LP) and reference light (LR), and a second optical branching part (14) which causes the pump light to be incident on one end of the optical fiber and outputs the Brillouin scattered light generated in the optical fiber, and the photodetector detects interference light between the Brillouin scattered light and the reference light.

Here, in the optical fiber characteristic measurement device according to one aspect of the present invention, the photodetector includes a first separation element (22a) which separates the reference light into first reference light (LR1) and second reference light (LR2) whose polarization directions are perpendicular to each other, a second separation element (22b) which separates the Brillouin scattered light into first scattered light (LS1) whose polarization direction is the same as that of the first reference light and second scattered light (LS2) whose polarization direction is the same as that of the second reference light, a first detector (23a) which detects interference light between the first scattered light and the first reference light, and a second detector (23b) which detects interference light between the second scattered light and the second reference light, and the intensity acquisitor acquires a first signal intensity, which is a signal intensity at the reference frequency, from a detection signal output from the first detector and acquires a second signal intensity, which is a signal intensity at the reference frequency, from a detection signal output from the second detector, and the measurer obtains the peak frequency of the Brillouin gain spectrum from the first signal intensity and the second signal intensity acquired by the intensity acquisitor.

Alternatively, the optical fiber characteristic measurement device according to one aspect of the present invention includes a polarization switch (30) which alternately switches a polarization direction of the reference light between a first direction and a second direction perpendicular to each other, and the intensity acquisitor acquires the first signal intensity, which is a signal intensity at the reference frequency, from the detection signal output from the photodetector when the polarization direction of the reference light is switched to the first direction by the polarization switch and acquires the second signal intensity, which is a signal intensity at the reference frequency, from the detection signal output from the photodetector when the polarization direction of the reference light is switched to the second direction by the polarization switch, and the measurer obtains the peak frequency of the Brillouin gain spectrum from the first signal intensity and the second signal intensity acquired by the intensity acquisitor.

Alternatively, the optical fiber characteristic measurement device according to one aspect of the present invention includes a polarization scrambler (40) which randomly changes a polarization state of the reference light with time.

Also, the optical fiber characteristic measurement device according to one aspect of the present invention includes an optical delay part (13) which delays the pump light between the first optical branching part and the second optical branching part.

An optical fiber characteristic measurement method according to one aspect of the present invention includes detecting Brillouin scattered light (LS) obtained by causing light to be incident on an optical fiber (FUT) by a photodetector (15, 15A), acquiring a signal intensity at a prescribed reference frequency (f1, f2) by an intensity acquisitor (16, 16A) from a detection signal (S1 to S3) output from the photodetector, and measuring characteristics of the optical fiber by a measurer (18, 18A, 18B) by obtaining a peak frequency of a Brillouin gain spectrum, which is a spectrum of the Brillouin scattered light, from the signal intensity at the reference frequency acquired by the intensity acquisitor.

Also, in the optical fiber characteristic measurement method according to one aspect of the present invention, the reference frequency is a frequency within a frequency band of a reference Brillouin gain spectrum obtained in a state in which the optical fiber is placed under a prescribed reference environment.

Also, in the optical fiber characteristic measurement method according to one aspect of the present invention, the reference frequency is a frequency at which an inclination of the reference Brillouin gain spectrum is the largest.

Also, in the optical fiber characteristic measurement method according to one aspect of the present invention, the reference frequency is two frequencies sandwiching the peak frequency of the reference Brillouin gain spectrum.

Also, in the optical fiber characteristic measurement method according to one aspect of the present invention, conversion information for converting the signal intensity at the reference frequency into the peak frequency of the Brillouin gain spectrum is stored by a storage (18a), and the peak frequency of the Brillouin gain spectrum is obtained from the signal intensity at the reference frequency acquired by the intensity acquisitor by the measurer using the conversion information stored in the storage.

Also, in the optical fiber characteristic measurement method according to one aspect of the present invention, frequency-modulated continuous light (L1) is output by a light source (11), the continuous light is branched into pump light (LP) and reference light (LR) by a first optical branching part (12), the pump light is caused to be incident on one end of the optical fiber and the Brillouin scattered light generated in the optical fiber is output by a second optical branching part (14), and interference light between the Brillouin scattered light and the reference light is detected by the photodetector.

Also, in the optical fiber characteristic measurement method according to one aspect of the present invention, the photodetector includes a first separation element (22a), a second separation element (22b), a first detector (23a), and a second detector (23b), the reference light is separated into first reference light and second reference light whose polarization directions are perpendicular to each other by the first separation element, the Brillouin scattered light is separated into first scattered light whose polarization direction is the same as that of the first reference light and second scattered light whose polarization direction is the same as that of the second reference light by the second separation element, interference light between the first scattered light and the first reference light is detected by the first detector, interference light between the second scattered light and the second reference light is detected by the second detector, a first signal intensity, which is a signal intensity at the reference frequency, is acquired from a detection signal output from the first detector and a second signal intensity, which is a signal intensity at the reference frequency, is acquired from a detection signal output from the second detector by the intensity acquisitor, and the peak frequency of the Brillouin gain spectrum is obtained by the measurer from the first signal intensity and the second signal intensity acquired by the intensity acquisitor.

Also, in the optical fiber characteristic measurement method according to one aspect of the present invention, a polarization direction of the reference light is alternately switched between a first direction and a second direction perpendicular to each other by a polarization switch (30), the first signal intensity which is a signal intensity at the reference frequency is acquired by the intensity acquisitor from the detection signal output from the photodetector when the polarization direction of the reference light is switched to the first direction by the polarization switch, the second signal intensity which is a signal intensity at the reference frequency is acquired by the intensity acquisitor from the detection signal output from the photodetector when the polarization direction of the reference light is switched to the second direction by the polarization switch, and the peak frequency of the Brillouin gain spectrum is obtained by the measurer from the first signal intensity and the second signal intensity acquired by the intensity acquisitor.

Also, in the optical fiber characteristic measurement method according to one aspect of the present invention, a polarization state of the reference light is randomly changed with time by a polarization scrambler (40).

Also, in the optical fiber characteristic measurement method according to one aspect of the present invention, the pump light is delayed between the first optical branching part and the second optical branching part by an optical delay part (13).

Further features and aspects of the present invention will become apparent from the detailed description of embodiments described below with reference to the accompanying drawings.

Advantageous Effects of Invention

According to the present invention, there is an effect that characteristics of a measurement target optical fiber can be measured in a shorter period of time.

DESCRIPTION OF EMBODIMENTS

Hereinafter, an optical fiber characteristic measurement device and an optical fiber characteristic measurement method according to embodiments of the present invention will be described in detail with reference to the drawings. Hereinafter, an outline of the embodiments of the present invention will be described first, and then details of each embodiment of the present invention will be described.

Outline

Embodiments of the present invention make it possible to measure characteristics of a measurement target optical fiber in a shorter period of time. Here, in order to measure characteristics of the measurement target optical fiber, it is necessary to obtain a Brillouin gain spectrum for each measurement point set in a length direction of the measurement target optical fiber and then obtain a peak frequency thereof. In order to obtain the Brillouin gain spectrum, it is necessary to perform a frequency sweep of a detection signal. For example, when a frequency band of 10.6 to 11.1 [GHz] is frequency-swept at a frequency interval of 1 [MHz], it is necessary to measure (sample) the detection signal 501 times.

Also, since the Brillouin scattered light emitted from the measurement target optical fiber is weak, noise is almost always superimposed on the obtained Brillouin gain spectrum. In an optical fiber characteristic measurement device, in order to remove the noise superimposed on the Brillouin gain spectrum, a process of obtaining and averaging the Brillouin gain spectrum is performed a plurality of times. Since this process is performed for each measurement point set in a length direction of the measurement target optical fiber, the measurement time becomes longer.

In the embodiment of the present invention, a signal intensity at a prescribed reference frequency is obtained from the detection signal of the Brillouin scattered light obtained by causing light to be incident on the measurement target optical fiber. Then, a peak frequency of the Brillouin gain spectrum is obtained from the obtained signal intensity at the reference frequency, and characteristics of the measurement target optical fiber are measured. That is, in the present embodiment, the characteristics of the measurement target optical fiber are measured by obtaining the peak frequency of the Brillouin gain spectrum only from the signal intensity at the prescribed reference frequency without frequency-sweeping the detection signal of the Brillouin scattered light. Thereby, measuring the characteristics of the measurement target optical fiber in a shorter period of time is made possible.

First Embodiment

<Configuration of Optical Fiber Characteristic Measurement Device>

Figure 1:
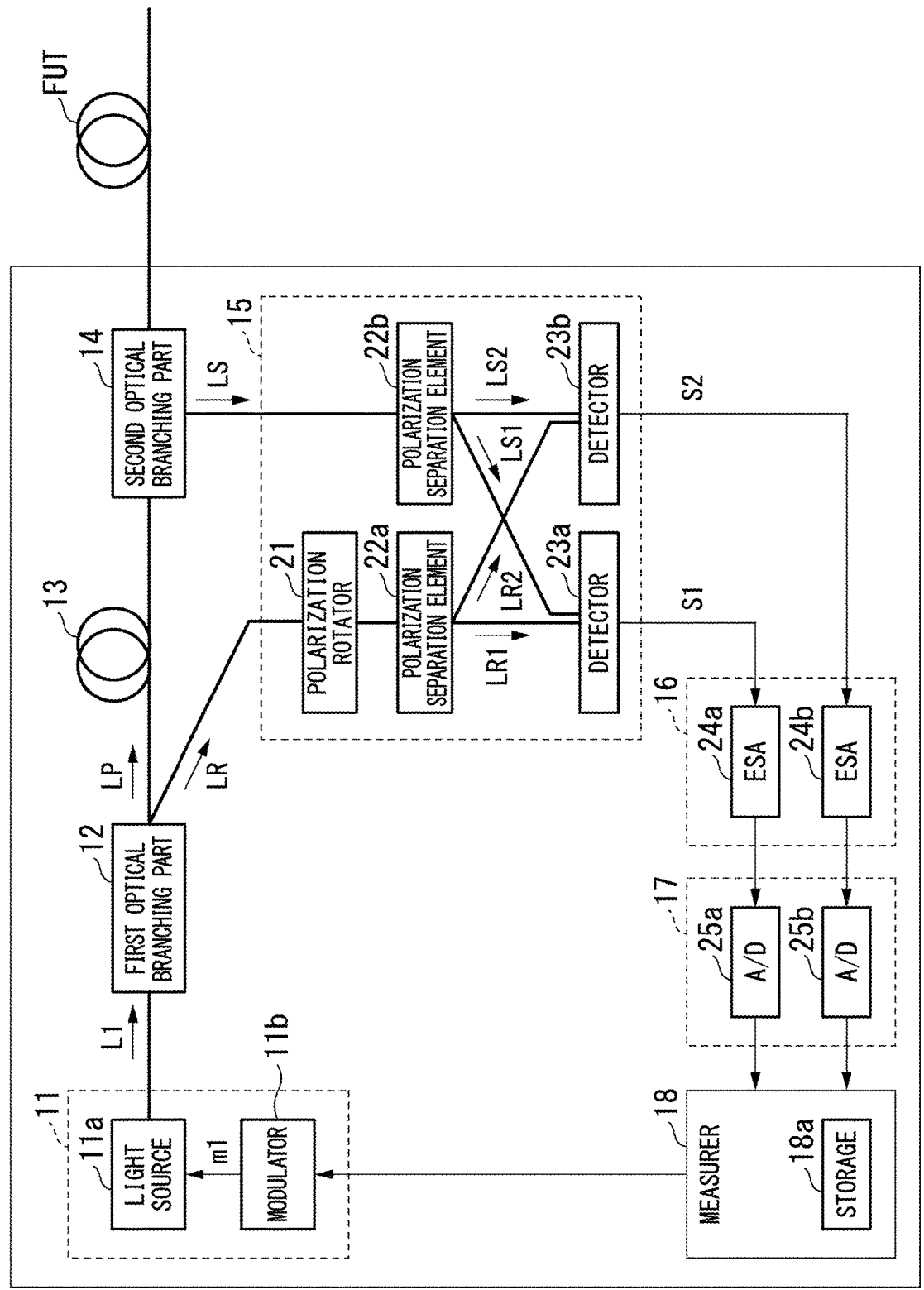
FIG. 1 is a block diagram illustrating a configuration of a main part of an optical fiber characteristic measurement device according to a first embodiment of the present invention.

FIG. 1 is a block diagram illustrating a configuration of a main part of an optical fiber characteristic measurement device according to a first embodiment of the present invention. As illustrated in FIG. 1, an optical fiber characteristic measurement device 1 of the present embodiment includes a light source 11, a first optical branching part 12, an optical delay part 13, a second optical branching part 14, a photodetector 15, an intensity acquisitor 16, a digitizer 17, and a measurer 18. The optical fiber characteristic measurement device 1 having such a configuration is a so-called BOCDR-type measurement device that measures characteristics of a measurement target optical fiber FUT on the basis of Brillouin scattered light LS obtained by causing pump light LP to be incident on the measurement target optical fiber FUT.

The pump light LP described above is continuous light to which frequency modulation is applied. The Brillouin scattered light LS described above is backscattered light generated by Brillouin scattering in the measurement target optical fiber FUT. Further, any measurement target optical fiber FUT may be used according to a wavelength of the pump light LP or the like. Also, in the present embodiment, in order to simplify the explanation, it is assumed that only one correlation peak appears in the measurement target optical fiber FUT.

Here, a connection between the light source 11 and the first optical branching part 12, a connection between the first optical branching part 12 and the photodetector 15, and connections between components inside the photodetector 15 are formed by, for example, a polarization maintaining fiber (PMF). This is for maintaining polarization states of continuous light L1 and reference light LR (details will be described later). On the other hand, the first optical branching part 12 and the second optical branching part 14 (including the optical delay part 13), and the second optical branching part 14 and the photodetector 15 are each connected by, for example, a single mode fiber (SMF). Further, in the present embodiment, the measurement target optical fiber FUT is assumed to be a single mode fiber.

The light source 11 includes a light source 11a and a modulator 11b and outputs frequency-modulated continuous light L1 under control of the measurer 18. The light source 11a includes a semiconductor laser element such as, for example, a distributed feed-back laser diode (DFB-LD) and outputs the continuous light L1 of linearly polarized light that has been frequency-modulated according to a modulation signal ml output from the modulator 11b. The modulator 11b outputs the modulation signal ml for frequency-modulating the continuous light L1 output from the light source 11a under the control of the measurer 18. The modulation signal ml is a signal having, for example, a sine-wave form, and a frequency (modulation frequency fm) and an amplitude thereof are controlled by the measurer 18.

The first optical branching part 12 branches the continuous light L1 output from the light source 11 into the pump light LP and the reference light LR at a prescribed intensity ratio (for example, 1:1). The optical delay part 13 delays the pump light LP branched by the first optical branching part 12 by a predetermined time. The optical delay part 13 includes, for example, an optical fiber (for example, a single mode fiber) having a predetermined length. The delay time can be adjusted by changing the length of the optical fiber. The reason for providing such an optical delay part 13 is to dispose a 0th-order correlation peak, which appears at a position that does not move even when the modulation frequency fm is swept, outside the measurement target optical fiber FUT. The optical delay part 13 may be provided between the first optical branching part 12 and the photodetector 15.

The second optical branching part 14 includes a first port, a second port, and a third port. The first port is connected to the first optical branching part 12 via the optical delay part 13. The second port is connected to the measurement target optical fiber FUT. The third port is connected to the photodetector 15. The second optical branching part 14 outputs the pump light LP input from the first port through the second port. Also, the Brillouin scattered light LS from the measurement target optical fiber FUT, which is input from the second port, is output through the third port. Such a second optical branching part 14 may be, for example, an optical circulator.

The photodetector 15 detects the Brillouin scattered light LS (Brillouin scattered light LS from the measurement target optical fiber FUT) output from the third port of the second optical branching part 14. Specifically, the photodetector 15 performs optical heterodyne detection by causing interference between the Brillouin scattered light LS output from the third port of the second optical branching part 14 and the reference light LR output from the first optical branching part 12.

The photodetector 15 includes a polarization rotator 21, a polarization separation element 22a (first separation element), a polarization separation element 22b (second separation element), a detector 23a (first detector), and a detector 23b (second detector). The polarization rotator 21 rotates a polarization direction of the reference light LR output from the first optical branching part 12 by $\pi/4$ (45°). The polarization rotator 21 may be, for example, a Faraday rotator.

The polarization separation element 22a separates the reference light LR via the polarization rotator 21 into reference light LR1 (first reference light) and reference light LR2 (second reference light) whose polarization directions are perpendicular to each other. Further, in the following, in order to facilitate understanding, a polarization direction of the reference light LR1 is referred to as "X direction" and a polarization direction of the reference light LR2 is referred to as "Y direction." The X direction is the same direction as, for example, the polarization direction of the reference light LR (reference light LR before passing through the polarization rotator 21) output from the first optical branching part 12.

The polarization separation element 22b separates the Brillouin scattered light LS output from the third port of the second optical branching part 14 into scattered light LS1 (first scattered light) and scattered light LS2 (second scattered light) whose polarization directions are perpendicular to each other. Here, a polarization direction of the scattered light LS1 is the same X direction as the polarization direction of the reference light LR1, and a polarization direction of the scattered light LS2 is the same Y direction as the polarization direction of the reference light LR2.

The detector 23a performs optical heterodyne detection by causing interference between the reference light LR1 separated by the polarization separation element 22a and the scattered light LS1 separated by the polarization separation element 22b. The detector 23a includes a balanced photodiode formed by, for example, connecting two photodiodes (PDs) in series and receives interference light between the reference light LR1 and the scattered light LS1 by the two photodiodes, respectively. A detection signal S1 which is an interference signal (beat signal) indicating a frequency difference between the reference light LR1 and the scattered light LS1 is output from the detector 23a.

The detector 23b performs optical heterodyne detection by causing interference between the reference light LR2 separated by the polarization separation element 22a and the scattered light LS2 separated by the polarization separation element 22b. Similarly to the detector 23a, the detector 23b includes, for example, a balanced photodiode and receives interference light between the reference light LR2 and the scattered light LS2 by the two photodiodes, respectively. A detection signal S2 which is an interference signal (beat signal) indicating a frequency difference between the reference light LR2 and the scattered light LS2 is output from the detector 23b.

Here, in the photodetector 15, as described above, it is divided into components (scattered light LS1 and reference light LR1) whose polarization direction is in the X direction and components (scattered light LS2 and reference light LR2) whose polarization direction is in the Y direction. Then, the detection signal S1 of the components whose polarization direction is in the X direction and the detection signal S2 of the components whose polarization direction is in the Y direction are configured to be obtained separately.

The reason of doing like this is for suppressing a change in the Brillouin gain spectrum that depends on a relative polarization state between the reference light LR and the Brillouin scattered light LS.

The intensity acquisitor 16 acquires a signal intensity at a prescribed reference frequency f1 (see FIG. 2: details will be described later) from the detection signals S1 and S2 output from the photodetector 15. Specifically, the intensity acquisitor 16 includes two spectrum analyzers (ESA: Electrical Spectrum Analyzer) 24a and 24b. The spectrum analyzer 24a obtains a signal intensity (first signal intensity) at the reference frequency f1 from the detection signal S1 output from the detector 23a of the photodetector 15. The spectrum analyzer 24b obtains a signal intensity (second signal intensity) at the reference frequency f1 from the detection signal S2 output from the detector 23b of the photodetector 15.

In this way, in the intensity acquisitor 16, acquiring the signal intensities at the reference frequency f1 from the detection signals S1 and S2 output from the photodetector 15 is for measuring the characteristics of the measurement target optical fiber FUT in a shorter period of time. That is, in the present embodiment, a time required for measurement is reduced by obtaining only the signal intensity at the reference frequency f1 without performing a process of obtaining the Brillouin gain spectrum by frequency-sweeping the detection signals S1 and S2 output from the photodetector 15.

The digitizer 17 includes A/D converters 25a and 25b to convert the signal intensities acquired by the intensity acquisitor 16 into digital signals. Specifically, the A/D converter 25a converts the signal intensity acquired by the spectrum analyzer 24a of the intensity acquisitor 16 into a digital signal. The A/D converter 25b converts the signal intensity acquired by the spectrum analyzer 24b of the intensity acquisitor 16 into a digital signal. Further, the signal intensity converted into a digital signal by the A/D converter 25a is defined as $I_X$, and the signal intensity converted into a digital signal by the A/D converter 25b is defined as $I_Y$.

The measurer 18 obtains a peak frequency of the Brillouin gain spectrum using the two digital signals ($I_X$ and $I_Y$) output from the digitizer 17. Specifically, the measurer 18 performs first processing of obtaining square-root of sum of squares ($\sqrt{(I_X^2+I_Y^2)}$) of the two digital signals output from the digitizer 17. The measurer 18 performs second processing of obtaining the peak frequency of the Brillouin gain spectrum by multiplying the square-root of sum of squares obtained by the first processing by a conversion coefficient stored in a storage 18a.

Here, the conversion coefficient stored in the above-described storage 18a is a coefficient (conversion information) that converts the signal intensity at the reference frequency f1 into the peak frequency of the Brillouin gain spectrum. Further, in order to reduce an influence of noise, the measurer 18 may perform the above-described first processing a plurality of times and obtain an average value of the plurality of obtained square-root of sum of squares.

Also, the measurer 18 measures the characteristics of the measurement target optical fiber FUT by obtaining a shift amount of a Brillouin frequency from the peak frequency of the obtained Brillouin gain spectrum. The measurer 18 may include a display that displays the obtained shift amount of the Brillouin frequency as physical information such as a distortion, a temperature, or the like. Also, information such as a distortion, a temperature, or the like of the measurement target optical fiber FUT may be interpreted as information indicating a state of an object to be measured and then displayed on the display. The display may be, for example, a liquid crystal display device, an organic electro luminescence (EL) display device, or the like.

Also, the measurer 18 generally controls the operation of the optical fiber characteristic measurement device 1. For example, the measurer 18 controls the modulator 11b provided in the light source 11 to change the modulation frequency fm of the continuous light L1 output from the light source 11. Changing the modulation frequency fm of the continuous light L1 is, for example, for moving a correlation peak in a length direction of the measurement target optical fiber FUT. Further, the measurer 18 can be realized by a computer such as, for example, a personal computer.

Figure 2:
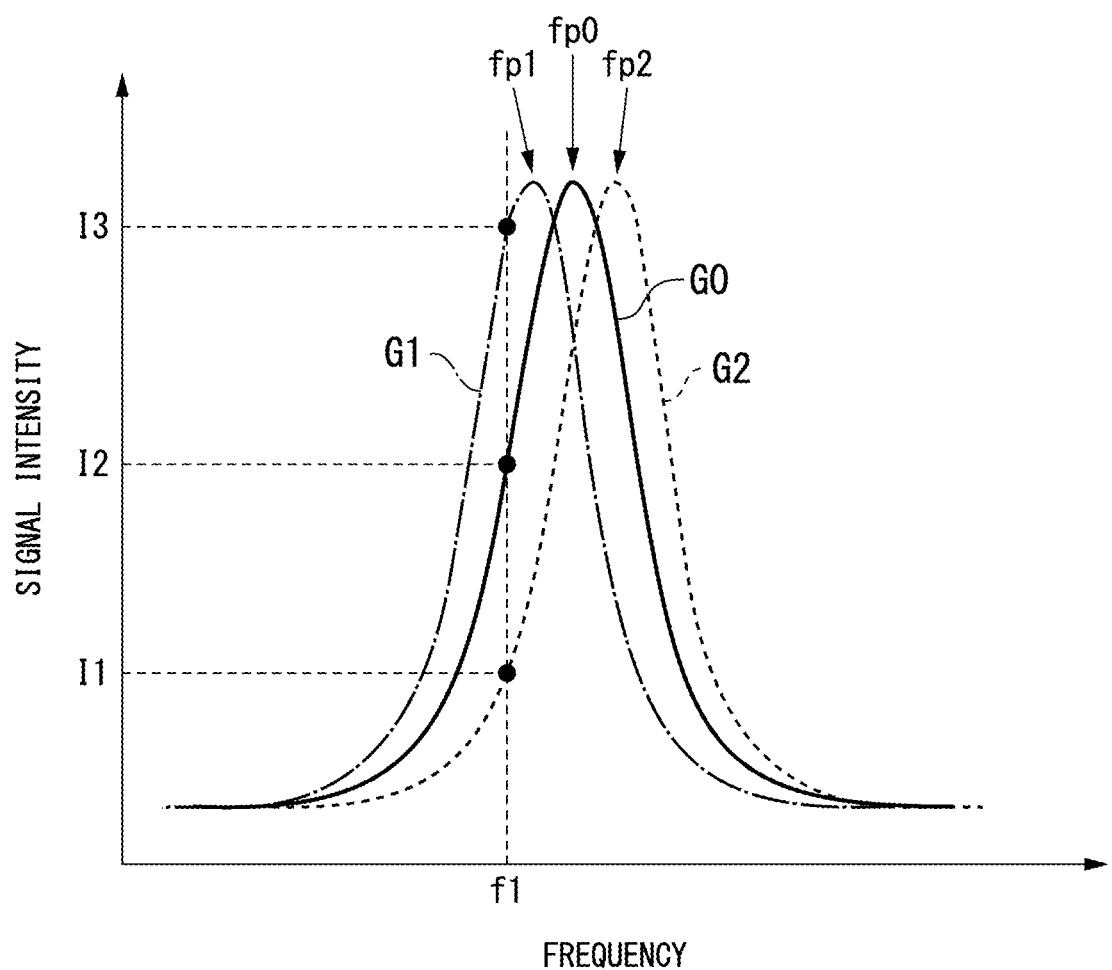
FIG. 2 is a diagram showing a relationship between a signal intensity at a prescribed reference frequency and a peak frequency of a Brillouin gain spectrum in the first embodiment of the present invention.

FIG. 2 is a diagram showing a relationship between a signal intensity at the prescribed reference frequency and a peak frequency of the Brillouin gain spectrum in the first embodiment of the present invention. In FIG. 2, the horizontal axis represents a frequency and the vertical axis represents a signal intensity, and an example of the Brillouin gain spectrum is shown. In the example illustrated in FIG. 2, three Brillouin gain spectra G0, G1, and G2 are shown.

The Brillouin gain spectrum G0 (reference Brillouin gain spectrum) is obtained in a state in which the measurement target optical fiber FUT is placed under a prescribed reference environment. On the other hand, the Brillouin gain spectra G1 and G2 in FIG. 2 are obtained in a state in which the measurement target optical fiber FUT is placed under an environment different from the reference environment. Here, the "prescribed reference environment" refers to, for example, an environment in which a temperature around the measurement target optical fiber FUT is a prescribed temperature (for example, room temperature 25° C.), and distortion is not applied to the measurement target optical fiber FUT. Also, the "environment different from the reference environment" refers to, for example, an environment in which distortion has been applied to the measurement target optical fiber FUT.

As shown in FIG. 2, a peak frequency of the Brillouin gain spectrum G0, which is obtained when the measurement target optical fiber FUT is placed under the prescribed reference environment, is fp0. When distortion is applied to the measurement target optical fiber FUT, the Brillouin gain spectrum shifts to a low frequency side or a high frequency side. Thereby, it is ascertained that a peak frequency of the Brillouin gain spectrum G1 is fp1 and a peak frequency of the Brillouin gain spectrum G2 is fp2.

The reference frequency f1 described above is defined as a frequency within a frequency band of the Brillouin gain spectrum G0 obtained in a state in which the measurement target optical fiber FUT is placed under the prescribed reference environment. Specifically, the reference frequency f1 is defined as a frequency at which the signal intensity changes significantly due to a shift of the Brillouin gain spectrum. For example, the reference frequency f1 is defined as a frequency at which an inclination of the Brillouin gain spectrum G0 is the largest.

In the example shown in FIG. 2, a signal intensity at the reference frequency f1 when the Brillouin gain spectrum G0 is obtained is I2. On the other hand, a signal intensity at the reference frequency f1 when the Brillouin gain spectrum G2 is obtained is I1 which is smaller than I2, while a signal intensity at the reference frequency f1 when the Brillouin gain spectrum G1 is obtained is I3 which is larger than I2.

Here, there is a one-to-one relationship between a shift amount of the Brillouin gain spectrum (an amount of change in the peak frequency of the Brillouin gain spectrum) and an amount of change in the signal intensity at the reference frequency f1. Therefore, when the signal intensity at the reference frequency f1 is known, the peak frequency of the Brillouin gain spectrum can be obtained. A coefficient for converting the signal intensity at the reference frequency f1 into the peak frequency of the Brillouin gain spectrum is stored in the storage 18a of the measurer 18 as information indicating the above-described relationship. The measurer 18 converts the signal intensity ($\sqrt{(I_X^2+I_Y^2)}$) at the reference frequency f1 into the peak frequency of the Brillouin gain spectrum using the coefficient stored in the storage 18a.

<Operation of Optical Fiber Characteristic Measurement Device>

Figure 3:
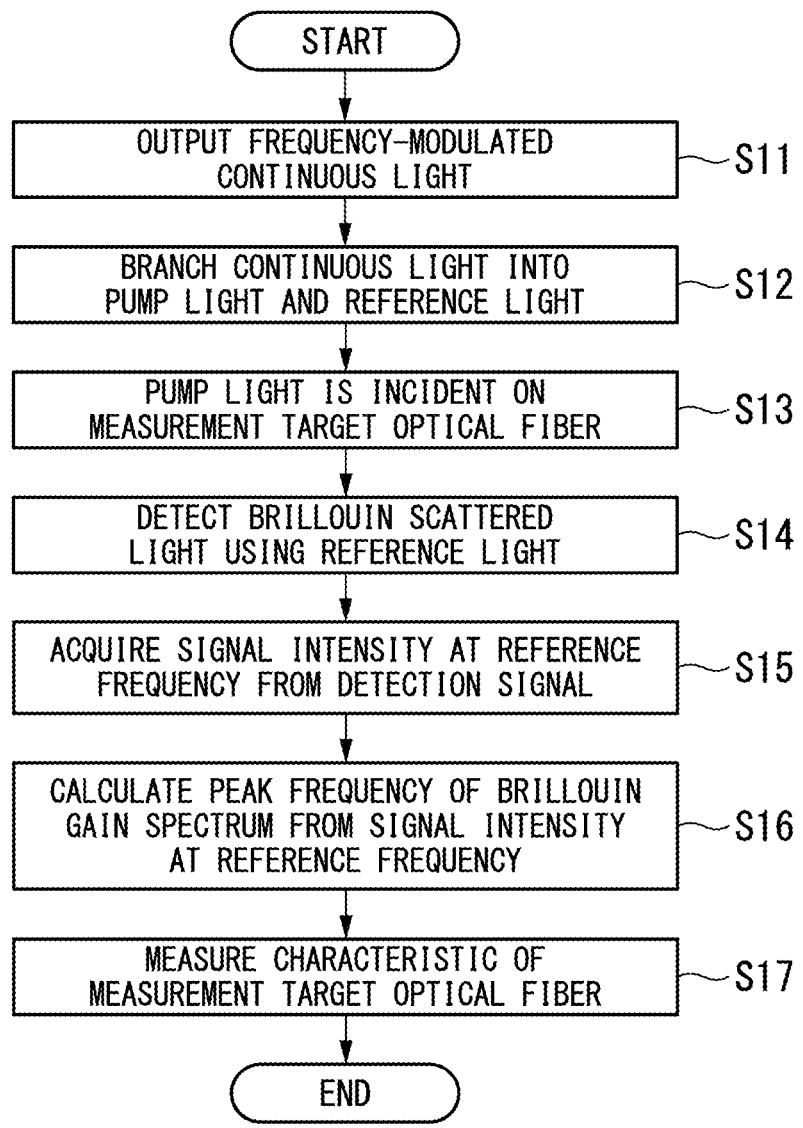
FIG. 3 is a flowchart showing an operation example of the optical fiber characteristic measurement device according to the first embodiment of the present invention.

FIG. 3 is a flowchart showing an operation example of the optical fiber characteristic measurement device according to the first embodiment of the present invention. The flowchart illustrated in FIG. 3 shows an operation when characteristics of one measurement point set in a length direction of the measurement target optical fiber FUT are measured. Further, the flowchart shown in FIG. 3 is started when, for example, a measurement start is instructed to the optical fiber characteristic measurement device 1.

When processing of the flowchart shown in FIG. 3 is started, first, the modulator 11b provided in the light source 11 is controlled by the measurer 18 to output the continuous light L1 of linearly polarized light that is frequency-modulated at the modulation frequency fm from the light source 11a (step S11). The continuous light L1 output from the light source 11a is incident on the first optical branching part 12 and is branched into the pump light LP and the reference light LR (step S12).

The branched-off pump light LP is incident on the measurement target optical fiber FUT sequentially through the optical delay part 13 and the second optical branching part 14 (step S13), and propagates in the measurement target optical fiber FUT. Accordingly, the Brillouin scattered light LS (backscattered light) is sequentially generated in the measurement target optical fiber FUT. Here, a frequency of the Brillouin scattered light LS generated in the measurement target optical fiber FUT is shifted due to an influence of an acoustic wave whose speed changes according to a distortion and a temperature of the measurement target optical fiber FUT.

For example, when a wavelength of the continuous light L1 output from the light source 11 is assumed to be about 1.55 [μm], the frequency of the Brillouin scattered light LS generated in the measurement target optical fiber FUT is shifted by, for example, about 10.8 [GHz] with respect to the above-described continuous light L1. The shift amount of the Brillouin frequency changes according to a distortion and a temperature applied to the measurement target optical fiber FUT.

The Brillouin scattered light LS generated in the measurement target optical fiber FUT propagates in a direction opposite to a direction in which the pump light LP propagates and is emitted from one end of the measurement target optical fiber FUT. The Brillouin scattered light LS emitted from one end of the optical fiber FUT is incident on the photodetector 15 via the second optical branching part 14. Then, the photodetector 15 detects the Brillouin scattered light LS using the reference light LR branched by the first optical branching part 12 (step S14: detection step).

Specifically, the Brillouin scattered light LS incident on the photodetector 15 is separated by the polarization separation element 22b into the scattered light LS1 whose polarization direction is in the X direction and the scattered light LS2 whose polarization direction is in the Y direction. Also, the reference light LR incident on the photodetector 15 is first rotated by π/4 in the polarization direction by the polarization rotator 21, and then is separated by the polarization separation element 22a into the reference light LR1 whose polarization direction is in the X direction and the reference light LR2 whose polarization direction is in the Y direction.

Then, the detector 23a performs optical heterodyne detection by causing interference between the reference light LR1 separated by the polarization separation element 22a and the scattered light LS1 separated by the polarization separation element 22b. Thereby, the detection signal S1 which is an interference signal (beat signal) indicating a frequency difference between the reference light LR1 and the scattered light LS1 is output from the detector 23a. Similarly, the detector 23b performs optical heterodyne detection by causing interference between the reference light LR2 separated by the polarization separation element 22a and the scattered light LS2 separated by the polarization separation element 22b. Thereby, the detection signal S2 which is an interference signal (beat signal) indicating a frequency difference between the reference light LR2 and the scattered light LS2 is output from the detector 23b.

The detection signals S1 and S2 output from the photodetector 15 are input to the intensity acquisitor 16. The intensity acquisitor 16 acquires signal intensities at the prescribed reference frequency f1 from the detection signals S1 and S2 (step S15: intensity acquisition step). Specifically, the spectrum analyzer 24a obtains a signal intensity (first signal intensity) at the reference frequency f1 from the detection signal S1. Also, the spectrum analyzer 24b obtains a signal intensity (second signal intensity) at the reference frequency f1 from the detection signal S2.

The signal intensities at the reference frequency f1 acquired by the intensity acquisitor 16 are converted into digital signals ($I_X$ and $I_Y$) by the digitizer 17 and then are input to the measurer 18. Then, the measurer 18 obtains a peak frequency of the Brillouin gain spectrum using the two digital signals ($I_X$ and $I_Y$) output from the digitizer 17 (step S16: measurement step).

Specifically, first, the measurer 18 obtains the square-root of sum of squares ($\sqrt{(I_X^2+I_Y^2)}$) of the two digital signals output from the digitizer 17 (first processing). Next, the measurer 18 obtains a peak frequency of the Brillouin gain spectrum by multiplying the square-root of sum of squares obtained by the first processing by the conversion coefficient stored in the storage 18a (second processing). Further, in order to reduce an influence of noise, the processing of steps S14 and S15 may be performed a plurality of times and the first processing described above may be performed a plurality of times to obtain an average value of the plurality of obtained square-root of sum of squares.

For example, when the square-root of sum of squares obtained in the first processing described above is the intensity I1 shown in FIG. 2, fp2 is obtained as the peak frequency of the Brillouin gain spectrum when the second processing described above is performed. Also, when the square-root of sum of squares obtained in the first processing described above is the intensity I2 shown in FIG. 2, fp0 is obtained as the peak frequency of the Brillouin gain spectrum when the second processing described above is performed. Further, when the square-root of sum of squares obtained in the first processing described above is the intensity I3 shown in FIG. 2, fp1 is obtained as the peak frequency of the Brillouin gain spectrum when the second processing described above is performed.

When the processing described above ends, the measurer 18 measures the characteristics of the measurement target optical fiber FUT by obtaining the shift amount of the Brillouin frequency from the peak frequency of the Brillouin gain spectrum (step S17: measurement step). For example, the measurer 18 obtains a distortion at one measurement point set in a length direction of the measurement target optical fiber FUT from the peak frequency of the Brillouin gain spectrum.

As described above, in the present embodiment, the signal intensity at the prescribed reference frequency f1 is obtained from the detection signals S1 and S2 of the Brillouin scattered light LS obtained by causing the pump light LP to be incident on the measurement target optical fiber FUT. Then, the peak frequency of the Brillouin gain spectrum is obtained from the obtained signal intensity at the reference frequency f1 to measure the characteristics of the measurement target optical fiber FUT. That is, in the present embodiment, the characteristics of the measurement target optical fiber FUT are measured by obtaining the peak frequency of the Brillouin gain spectrum only from the signal intensity at the prescribed reference frequency f1 without frequency-sweeping the detection signals S1 and S2 of the Brillouin scattered light LS. Thereby, the characteristics of the measurement target optical fiber can be measured in a shorter period of time.

Second Embodiment

<Configuration of Optical Fiber Characteristic Measurement Device>

Figure 4:
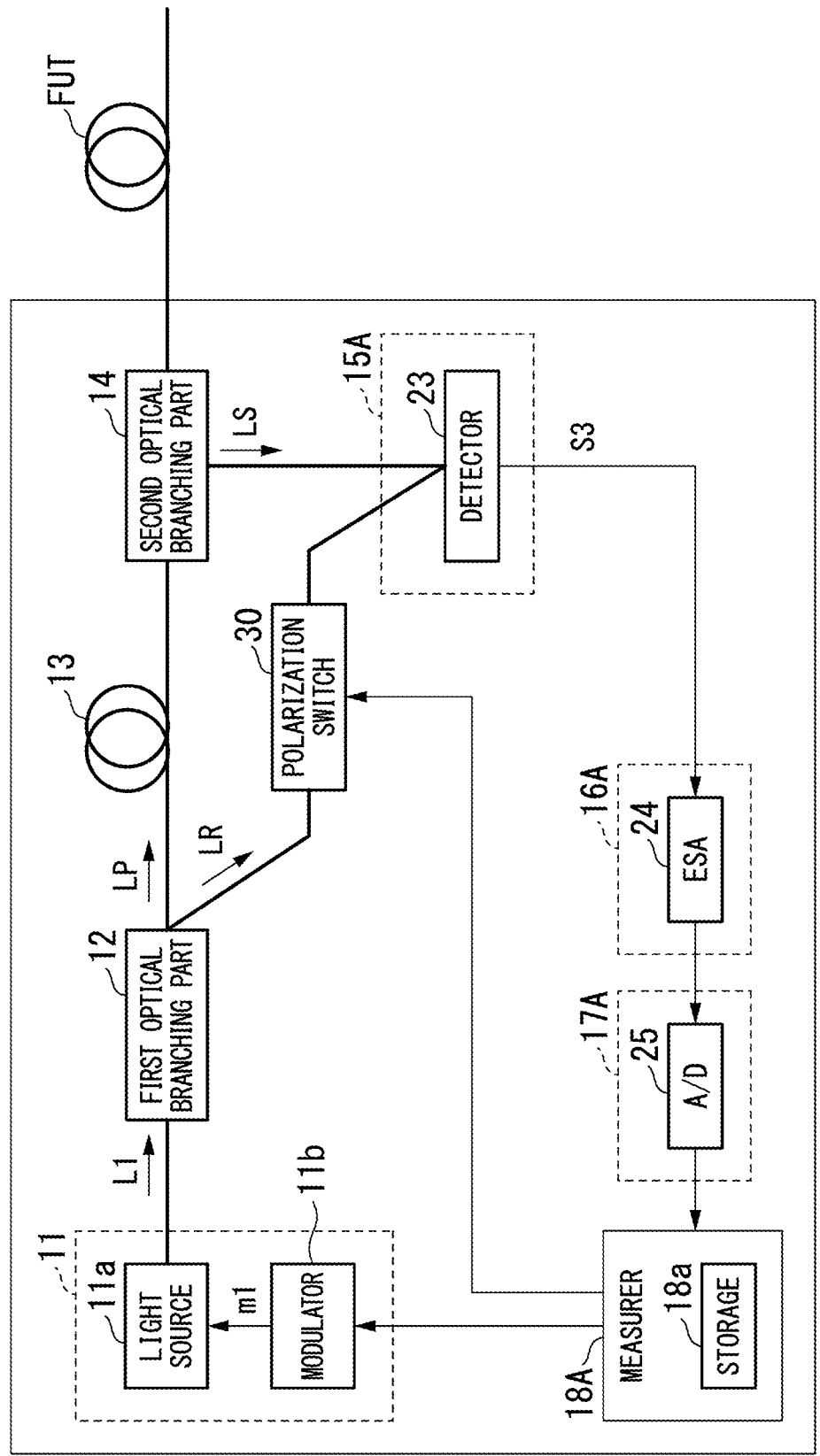
FIG. 4 is a block diagram illustrating a configuration of a main part of an optical fiber characteristic measurement device according to a second embodiment of the present invention.

FIG. 4 is a block diagram illustrating a configuration of a main part of an optical fiber characteristic measurement device according to a second embodiment of the present invention. In FIG. 4, components the same as the components illustrated in FIG. 1 will be denoted by the same reference signs. As illustrated in FIG. 4, an optical fiber characteristic measurement device 2 of the present embodiment has a configuration in which the photodetector 15, the intensity acquisitor 16, the digitizer 17, and the measurer 18 of the optical fiber characteristic measurement device 1 illustrated in FIG. 1 are replaced with the photodetector 15A, the intensity acquisitor 16A, the digitizer 17A, and the measurer 18A, and a polarization switch 30 is added.

The optical fiber characteristic measurement device 1 of the first embodiment described above simultaneously obtained the detection signal S1 of the components (the scattered light LS1 and the reference light LR1) whose polarization direction is in the X direction and the detection signal S2 of the components (the scattered light LS2 and the reference light LR2) whose polarization direction is in the Y direction. On the other hand, the optical fiber characteristic measurement device 2 of the present embodiment alternately obtains (in a time-division manner) a detection signal of a component whose polarization direction is in the X direction and a detection signal of a component whose polarization direction is in the Y direction.

Similarly to the photodetector 15 illustrated in FIG. 1, the photodetector 15A detects a Brillouin scattered light LS (Brillouin scattered light LS from a measurement target optical fiber FUT) output from a third port of a second optical branching part 14. However, unlike the photodetector 15 illustrated in FIG. 1, the photodetector 15A includes only a detector 23. The detector 23 is the same as the detectors 23a and 23b illustrated in FIG. 1. The detector 23 performs optical heterodyne detection by causing interference between the Brillouin scattered light LS output from the third port of the second optical branching part 14 and a reference light LR output from a first optical branching part 12 and passed through the polarization switch 30. A detection signal S3 which is an interference signal (beat signal) indicating a frequency difference between the reference light LR and the Brillouin scattered light LS is output from the detector 23.

The intensity acquisitor 16A includes a spectrum analyzer 24 and acquires a signal intensity at a prescribed reference frequency f1 from the detection signal S3 output from the photodetector 15. Further, the spectrum analyzer 24 is the same as the spectrum analyzers 24a and 24b illustrated in FIG. 1. The digitizer 17A includes an A/D converter 25 to convert the signal intensity acquired by the intensity acquisitor 16 into a digital signal. Further, the A/D converter 25 is the same as the A/D converters 25a and 25b illustrated in FIG. 1. The measurer 18A is substantially the same as the measurer 18 illustrated in FIG. 1, but is different from the measurer 18 illustrated in FIG. 1 in terms of performing control of the polarization switch 30.

The polarization switch 30 is provided between the first optical branching part 12 and the photodetector 15A. The polarization switch 30 switches a polarization direction of the reference light LR branched by the first optical branching part 12 under control of the measurer 18A. Specifically, the polarization switch 30 alternately switches the polarization direction of the reference light LR between the X direction (first direction) and the Y direction (second direction) perpendicular to each other.

<Operation of Optical Fiber Characteristic Measurement Device>

Figure 5:
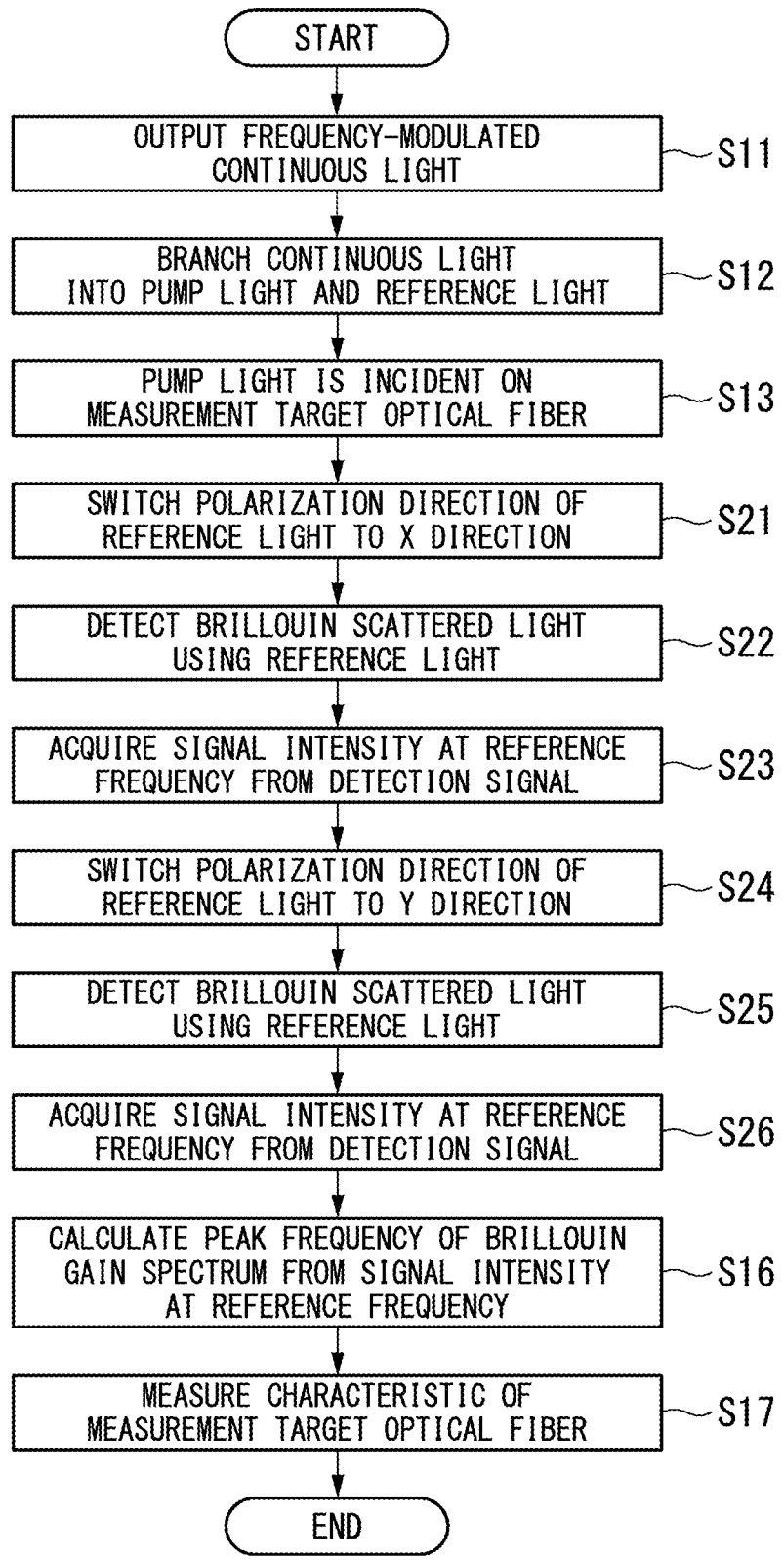
FIG. 5 is a flowchart showing an operation example of the optical fiber characteristic measurement device according to the second embodiment of the present invention.

FIG. 5 is a flowchart showing an operation example of the optical fiber characteristic measurement device according to the second embodiment of the present invention. In FIG. 5, steps the same as the steps of the flowchart shown in FIG. 3 will be denoted by the same reference signs. The flowchart shown in FIG. 5 shows an operation when characteristics of one measurement point set in a length direction of the measurement target optical fiber FUT are measured similarly to that in FIG. 3.

When processing of the flowchart shown in FIG. 5 is started, as in the first embodiment, continuous light L1 of linearly polarized light that is frequency-modulated at a modulation frequency fm is output from a light source 11a (step S11), and the continuous light L1 is incident on the first optical branching part 12 and is branched into a pump light LP and the reference light LR (step S12). Then, the branched-off pump light LP is incident on the measurement target optical fiber FUT sequentially through an optical delay part 13 and the second optical branching part 14 (step S13). Further, as the pump light LP propagates in the measurement target optical fiber FUT, the Brillouin scattered light LS (backscattered light) is sequentially generated in the measurement target optical fiber FUT.

Next, the measurer 18A controls the polarization switch 30 to switch a polarization direction of the reference light LR to the X direction (step S21). Next, the photodetector 15A detects the Brillouin scattered light LS using the reference light LR that has passed through the polarization switch 30 (step S22). Specifically, the detector 23 performs optical heterodyne detection by causing interference between the reference light LR whose polarization direction is in the X direction and the Brillouin scattered light LS. Thereby, the detection signal S3 which is an interference signal (beat signal) indicating a frequency difference between the reference light LR whose polarization direction is in the X direction and the scattered light LS is output from the detector 23.

The detection signal S3 output from the photodetector 15A is input to the intensity acquisitor 16A. The intensity acquisitor 16A acquires a signal intensity (first signal intensity) at the prescribed reference frequency f1 from the detection signal S3 (step S23). The signal intensity at the reference frequency f1 acquired by the intensity acquisitor 16A is converted into a digital signal ($I_X$) by the digitizer 17A and is input to the measurer 18A.

Next, the measurer 18A controls the polarization switch 30 to switch the polarization direction of the reference light LR to the Y direction (step S24). Next, the photodetector 15A detects the Brillouin scattered light LS using the reference light LR that has passed through the polarization switch 30 (step S25). Specifically, the detector 23 performs optical heterodyne detection by causing interference between the reference light LR whose polarization direction is in the Y direction and the Brillouin scattered light LS. Thereby, the detection signal S3 which is an interference signal (beat signal) indicating a frequency difference between the reference light LR whose polarization direction is in the Y direction and the scattered light LS is output from the detector 23.

The detection signal S3 output from the photodetector 15A is input to the intensity acquisitor 16A. The intensity acquisitor 16A acquires a signal intensity (second signal intensity) at the prescribed reference frequency f1 from the detection signal S3 (step S26). The signal intensity at the reference frequency f1 acquired by the intensity acquisitor 16A is converted into a digital signal ($I_Y$) by the digitizer 17A and is input to the measurer 18A.

Then, the measurer 18A obtains a peak frequency of the Brillouin gain spectrum using the two digital signals ($I_X$ and $I_Y$) sequentially output from the digitizer 17A (step S16). Specifically, first, the measurer 18A obtains square-root of sum of squares ($\sqrt{(I_X^2 + I_Y^2)}$) of the two digital signals sequentially output from the digitizer 17A (first processing). Next, the measurer 18A obtains the peak frequency of the Brillouin gain spectrum by multiplying the square-root of sum of squares obtained by the first processing by a conversion coefficient stored in a storage 18a (second processing). Further, in order to reduce an influence of noise, the processing of steps S23 and S25 may be performed a plurality of times and the first processing described above may be performed a plurality of times to obtain an average value of the plurality of obtained square-root of sum of squares.

When the processing described above ends, the measurer 18A measures characteristics of the measurement target optical fiber FUT by obtaining a shift amount of a Brillouin frequency from the peak frequency of the Brillouin gain spectrum (step S17). For example, the measurer 18 obtains a distortion at one measurement point set in a length direction of the measurement target optical fiber FUT from the peak frequency of the Brillouin gain spectrum.

As described above, in the present embodiment, the signal intensity at the prescribed reference frequency f1 is obtained from the detection signal S3 of the Brillouin scattered light LS obtained by causing the pump light LP to be incident on the measurement target optical fiber FUT. Then, the peak frequency of the Brillouin gain spectrum is obtained from the obtained signal intensity at the reference frequency f1 to measure the characteristics of the measurement target optical fiber FUT. As described above, in the present embodiment, as in the first embodiment, the characteristics of the measurement target optical fiber FUT are measured by obtaining the peak frequency of the Brillouin gain spectrum only from the signal intensity at the prescribed reference frequency f1 without frequency-sweeping the detection signal S3 of the Brillouin scattered light LS. Thereby, the characteristics of the measurement target optical fiber can be measured in a shorter period of time.

Also, in the present embodiment, the polarization direction of the reference light LR is configured to be alternately switched between the X direction and the Y direction perpendicular to each other by the polarization switch 30 provided between the first optical branching part 12 and the photodetector 15A. Thereby, since the photodetector 15, the intensity acquisitor 16, and the digitizer 17 illustrated in FIG. 1 can be replaced with the photodetector 15A, the intensity acquisitor 16A, and the digitizer 17A, the configuration can be simplified and costs can be reduced.

Third Embodiment

<Configuration of Optical Fiber Characteristic Measurement Device>

Figure 6:
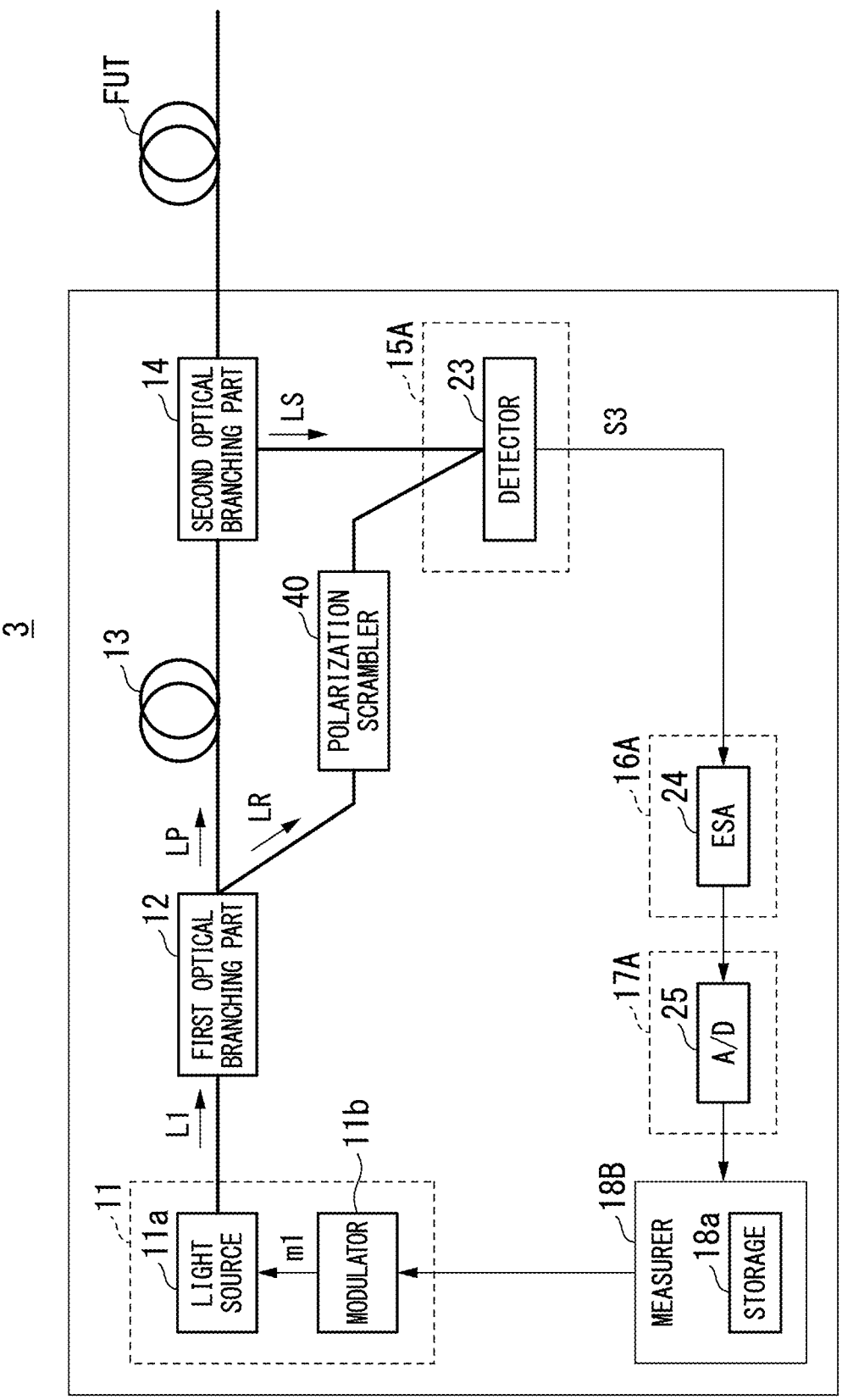
FIG. 6 is a block diagram illustrating a configuration of a main part of an optical fiber characteristic measurement device according to a third embodiment of the present invention.

FIG. 6 is a block diagram illustrating a configuration of a main part of an optical fiber characteristic measurement device according to a third embodiment of the present invention. In FIG. 6, components the same as the components illustrated in FIG. 4 will be denoted by the same reference signs. As illustrated in FIG. 6, an optical fiber characteristic measurement device 3 of the present embodiment has a configuration in which the measurer 18A of the optical fiber characteristic measurement device 2 illustrated in FIG. 4 is replaced with a measurer 18B, and the polarization switch 30 is replaced with a polarization scrambler 40.

The optical fiber characteristic measurement device 2 of the second embodiment described above alternately obtains (in a time-division manner) the detection signal of a component whose polarization direction is in the X direction and the detection signal of a component whose polarization direction is in the Y direction. On the other hand, the optical fiber characteristic measurement device 3 of the present embodiment is configured to randomly change a polarization direction of a reference light LR using the polarization scrambler 40 without separating a component whose polarization direction is in the X direction and a component whose polarization direction is in the Y direction. The reason of doing like this is for suppressing a change in the Brillouin gain spectrum that depends on a relative polarization state between the reference light LR and a Brillouin scattered light LS.

The measurer 18B is slightly different from the measurer 18A in processing of obtaining a peak frequency of the Brillouin gain spectrum. Specifically, the measurer 18B does not perform the first processing (processing of obtaining the square-root of sum of squares of the two digital signals sequentially output from the digitizer 17A) performed by the measurer 18A. The measurer 18B performs processing of obtaining a peak frequency of the Brillouin gain spectrum by multiplying a digital signal output from a digitizer 17A by a conversion coefficient stored in a storage 18a. Also, the function of controlling the polarization switch 30 of the measurer 18A is omitted in the measurer 18B.

The polarization scrambler 40 is provided between a first optical branching part 12 and a photodetector 15A and randomly changes a polarization state of the reference light LR branched by the first optical branching part 12 with time. A speed at which the polarization scrambler 40 changes the polarization state of the reference light LR is significantly faster than a speed at which the polarization switch 30 switches the polarization direction of the reference light LR. For example, the polarization scrambler 40 changes the polarization state of the reference light LR at high speed (at a frequency on the order of MHz) and averages influences of the polarization states.

<Operation of Optical Fiber Characteristic Measurement Device>

A basic operation of the optical fiber characteristic measurement device 3 of the present embodiment is the same as the operation of the optical fiber characteristic measurement device 1 of the first embodiment. Therefore, the optical fiber characteristic measurement device 3 performs the operation according to the flowchart shown in FIG. 3. Hereinafter, the operation of the optical fiber characteristic measurement device 3 will be described with reference to FIG. 3.

When the operation of the optical fiber characteristic measurement device 3 is started, as in the first embodiment, continuous light L1 of linearly polarized light that is frequency-modulated at a modulation frequency fm is output from a light source 11a (step S11), and the continuous light L1 is incident on the first optical branching part 12 and is branched into a pump light LP and the reference light LR (step S12). Then, the branched-off pump light LP is incident on a measurement target optical fiber FUT sequentially through an optical delay part 13 and a second optical branching part 14 (step S13). Further, as the pump light LP propagates in the measurement target optical fiber FUT, the Brillouin scattered light LS (backscattered light) is sequentially generated in the measurement target optical fiber FUT.

Next, the photodetector 15A detects the Brillouin scattered light LS using the reference light LR that has passed through the polarization scrambler 40 (step S14). Specifically, the detector 23 performs optical heterodyne detection by causing interference between the reference light LR whose polarization direction randomly changes with time and the Brillouin scattered light LS. Thereby, a detection signal S3 which is an interference signal (beat signal) indicating a frequency difference between the reference light LR and the scattered light LS is output from the detector 23.

The detection signal S3 output from the photodetector 15A is input to an intensity acquisitor 16A. The intensity acquisitor 16A acquires a signal intensity at a prescribed reference frequency f1 from the detection signal S3 (step S15). The signal intensity at the reference frequency f1 acquired by the intensity acquisitor 16A is converted into a digital signal by the digitizer 17A and is input to the measurer 18B.

Next, the measurer 18B obtains the peak frequency of the Brillouin gain spectrum using the digital signal output from the digitizer 17A (step S16). Specifically, the measurer 18B obtains the peak frequency of the Brillouin gain spectrum by multiplying the digital signal output from the digitizer 17A by the conversion coefficient stored in the storage 18a. Further, in order to reduce an influence of noise, the processing of steps S14 and S15 may be performed a plurality of times, and an average value of the plurality of obtained digital signals may be obtained.

When the processing described above ends, the measurer 18B measures characteristics of the measurement target optical fiber FUT by obtaining a shift amount of a Brillouin frequency from the peak frequency of the Brillouin gain spectrum (step S17). For example, the measurer 18B obtains a distortion at one measurement point set in a length direction of the measurement target optical fiber FUT from the peak frequency of the Brillouin gain spectrum.

As described above, in the present embodiment, the signal intensity at the prescribed reference frequency f1 is obtained from the detection signal S3 of the Brillouin scattered light LS obtained by causing the pump light LP to be incident on the measurement target optical fiber FUT. Then, the peak frequency of the Brillouin gain spectrum is obtained from the obtained signal intensity at the reference frequency f1 to measure the characteristics of the measurement target optical fiber FUT. As described above, in the present embodiment, as in the first embodiment, the characteristics of the measurement target optical fiber FUT are measured by obtaining the peak frequency of the Brillouin gain spectrum only from the signal intensity at the prescribed reference frequency f1 without frequency-sweeping the detection signal S3 of the Brillouin scattered light LS. Thereby, the characteristics of the measurement target optical fiber can be measured in a shorter period of time.

Also, in the present embodiment, the polarization direction of the reference light LR is randomly changed with time by the polarization scrambler 40 provided between the first optical branching part 12 and the photodetector 15A. Thereby, since the photodetector 15, the intensity acquisitor 16, and the digitizer 17 illustrated in FIG. 1 can be replaced with the photodetector 15A, the intensity acquisitor 16A, and the digitizer 17A, the configuration can be simplified and costs can be reduced.

Although the optical fiber characteristic measurement device and the optical fiber characteristic measurement method according to the embodiment of the present invention have been described above, the present invention is not limited to the above-described embodiment and can be freely changed within the scope of the present invention. For example, in the embodiments described above, the signal intensity at one prescribed reference frequency f1 was acquired by the intensity acquisitor 16 or 16A, and the peak frequency of the Brillouin gain spectrum was obtained by the measurer 18, 18A, or 18B from the acquired signal intensity at the one reference frequency f1. However, signal intensities at a plurality of prescribed reference frequencies may be acquired by the intensity acquisitor 16 or 16A, and the peak frequency of the Brillouin gain spectrum may be obtained by the measurer 18, 18A, or 18B from the acquired signal intensities at the plurality of reference frequencies.

Figure 7:
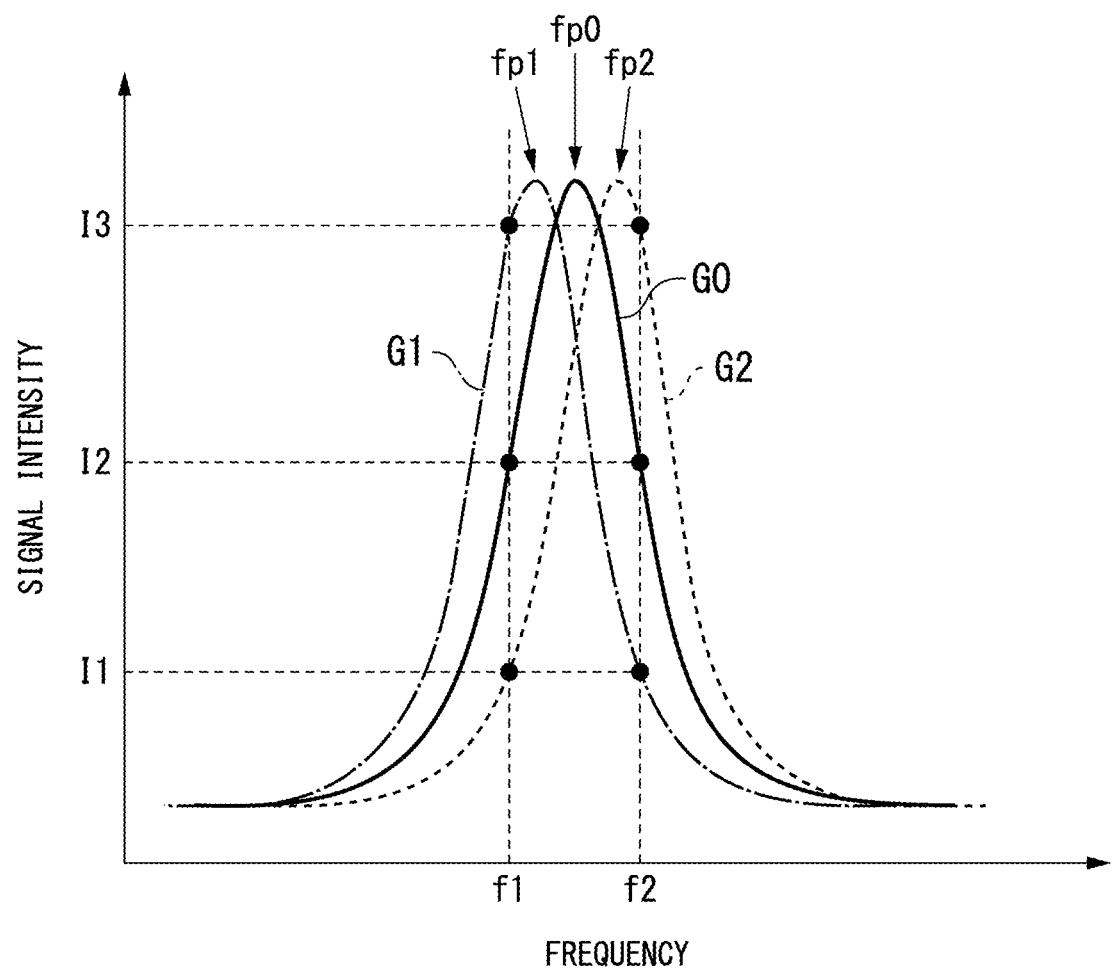
FIG. 7 is a diagram showing a relationship between signal intensities at a plurality of prescribed reference frequencies and peak frequencies of Brillouin gain spectra.

FIG. 7 is a diagram showing a relationship between signal intensities at a plurality of prescribed reference frequencies and peak frequencies of Brillouin gain spectra. In FIG. 7, the horizontal axis represents a frequency, the vertical axis represents a signal intensity, and three Brillouin gain spectra G0, G1, and G2 are shown as those in FIG. 2.

In the example shown in FIG. 7, a reference frequency f2 is set in addition to the reference frequency f1 described above. The reference frequencies f1 and f2 are both defined as frequencies within a frequency band of the Brillouin gain spectrum G0 obtained in a state in which the measurement target optical fiber FUT is placed under a prescribed reference environment. Specifically, the reference frequencies f1 and f2 are defined to sandwich a peak frequency fp0 of the Brillouin gain spectrum G0. For example, the reference frequencies f1 and f2 may be defined to sandwich the peak frequency fp0 of the Brillouin gain spectrum G0 at equal intervals. Similarly to the reference frequency f1, the reference frequency f2 is defined as a frequency at which the signal intensity changes significantly due to a shift of the Brillouin gain spectrum. For example, the reference frequency f2 may be defined as a frequency at which an inclination (absolute value) of the Brillouin gain spectrum G0 is the largest as in the reference frequency f1.

In the example shown in FIG. 2, signal intensities at the reference frequencies f1 and f2 when the Brillouin gain spectrum G0 is obtained are both I2. When the Brillouin gain spectrum G1 is obtained, a signal intensity at the reference frequency f1 is I3 that is larger than I2, and a signal intensity at the reference frequency f2 is I1 that is smaller than I2. Conversely, when the Brillouin gain spectrum G2 is obtained, a signal intensity at the reference frequency f1 is I1 that is smaller than I2, and a signal intensity at the reference frequency f2 is I3 which is larger than I2.

Here, there is a one-to-one relationship between a shift amount of the Brillouin gain spectrum (an amount of change in the peak frequency of the Brillouin gain spectrum) and an amount of change in the signal intensity at the reference frequency f1. Similarly, there is a one-to-one relationship between a shift amount of the Brillouin gain spectrum (an amount of change in the peak frequency of the Brillouin gain spectrum) and an amount of change in the signal intensity at the reference frequency f2. Therefore, when the signal intensities at the reference frequencies f1 and f2 are known, the peak frequencies of the Brillouin gain spectra can be obtained.

When the signal intensities of the two reference frequencies f1 and f2 are acquired, information indicating a relationship between the signal intensity at the reference frequency f1, the signal intensity at the reference frequency f2, and the peak frequency of the Brillouin gain spectrum is stored in the storage 18a of the measurer 18. Then, processing of obtaining the peak frequency of the Brillouin gain spectrum using the information stored in the storage 18a is performed in the measurer 18. When signal intensities at a plurality of reference frequencies are acquired, an error of the peak frequency of the Brillouin gain spectrum can be reduced compared to a case in which a signal intensity at one reference frequency is acquired.

Also, in the embodiments described above, the optical fiber characteristic measurement device of the BOCDR type has been described as an example, but the present invention can also be applied to devices other than the optical fiber characteristic measurement device of the BOCDR type. Specifically, the present invention can be applied to devices in which processing of obtaining a shift amount of the Brillouin frequency is performed by acquiring the Brillouin gain spectrum and analyzing the Brillouin gain spectrum. Such a device may be, for example, an optical fiber characteristic measurement device of a Brillouin optical correlation domain analysis (BOCDA) type.

Also, in the embodiment described above, it has been described that only one correlation peak appears in the measurement target optical fiber FUT to simplify the explanation. When a plurality of correlation peaks appear in the measurement target optical fiber FUT, for example, one of the plurality of correlation peaks may be selected by using a method called a time gate method, and only the Brillouin scattered light at a position at which the selected correlation peak appears may be extracted.

Also, the optical delay part 13 may be provided between the second optical branching part 14 and the photodetector 15 or 15A other than between the first optical branching part 12 and the second optical branching part 14 or between the first optical branching part 12 and the photodetector 15 or 15A. Also, a first optical amplifier that amplifies the pump light LP may be provided between the first optical branching part 12 and the second optical branching part 14. Also, a second optical amplifier that amplifies the Brillouin scattered light LS may be provided between the second optical branching part 14 and the photodetector 15 or 15A. Also, a third optical amplifier that amplifies the reference light LR may be provided between the first optical branching part 12 and the photodetector 15 or 15A.

Also, in the optical fiber characteristic measurement device 1 of the first embodiment, a first signal amplifier for amplifying the detection signal S1 may be provided between the detector 23a and the spectrum analyzer 24a, and a second signal amplifier for amplifying the detection signal S2 may be provided between the detector 23b and the spectrum analyzer 24b. Also, in the optical fiber characteristic measurement devices 2 and 3 of the second and third embodiments, a signal amplifier for amplifying the detection signal S3 may be provided between the detector 23 and the spectrum analyzer 24.

In the present specification, terms indicating directions such as "forward, rearward, upward, downward, rightward, leftward, vertical, horizontal, longitudinal, lateral, row, and column" refer to these directions in the device of the present invention. Therefore, these terms in the specification of the present invention should be construed as being relative to each other in the device of the present invention.

The term "configured" is referred to as being configured to perform a function of the present invention or is used to describe configurations, elements, or parts of the device.

Further, the term expressed as "means, plus, or function" in the claim should include any structure that can be utilized to perform a function contained in the present invention.

The term "unit" is used to refer to a component, unit, hardware, or a portion of software programmed to execute a desired function. Typical examples of hardware are devices and circuits, but the present invention is not limited to these.

While preferred examples of the present invention have been described above, the present invention is not limited to these examples. Additions, omissions, substitutions, and other changes to the configurations can be made without departing from the meaning of the present invention. The present invention is not to be considered as being limited by the foregoing description and is only limited by the scope of the appended claims.

REFERENCE SIGNS LIST 1 to 3 Optical fiber characteristic measurement device
11 Light source
12 First optical branching part
13 Optical delay part
14 Second optical branching part
15, 15A Photodetector
16, 16A Intensity acquisitor
18, 18A, 18B Measurer
18a Storage
22a, 22b Polarization separation element
23a, 23b Detector
30 Polarization switch
40 Polarization scrambler
f1, f2 Reference frequency
FUT Measurement target optical fiber
L1 Continuous light
LP Pump light
LR Reference light
LR1, LR2 Reference light
LS Brillouin scattered light
LS1, LS2 Scattered light
S1 to S3 Detection signal

The invention claimed is:

1. An optical fiber characteristic measurement device comprising:
    a photodetector configured to detect Brillouin scattered light obtained by causing light to be incident on an optical fiber;
    an intensity acquisitor configured to acquire a signal intensity at a prescribed reference frequency from a detection signal output from the photodetector;
    a measurer configured to measure characteristics of the optical fiber by obtaining a peak frequency of a Brillouin gain spectrum, which is a spectrum of the Brillouin scattered light, from the signal intensity at the reference frequency acquired by the intensity acquisitor;
    a light source configured to output frequency-modulated continuous light;
    a first optical branching part configured to branch the continuous light into pump light and reference light; and
    a second optical branching part configured to cause the pump light to be incident on one end of the optical fiber, and configured to output the Brillouin scattered light generated in the optical fiber,
    wherein the photodetector comprises:
        a first separation element configured to separate the reference light into first reference light and second reference light whose polarization directions are perpendicular to each other;
        a second separation element configured to separate the Brillouin scattered light into first scattered light whose polarization direction is the same as that of the first reference light and second scattered light whose polarization direction is the same as that of the second reference light;
        a first detector configured to detect interference light between the first scattered light and the first reference light; and
        a second detector configured to detect interference light between the second scattered light and the second reference light.

2. The optical fiber characteristic measurement device according to claim 1,
    wherein the reference frequency is a frequency within a frequency band of a reference Brillouin gain spectrum obtained in a state in which the optical fiber is placed under a prescribed reference environment.

3. The optical fiber characteristic measurement device according to claim 2,
    wherein the reference frequency is a frequency at which an inclination of the reference Brillouin gain spectrum is the largest.

4. The optical fiber characteristic measurement device according to claim 2,
    wherein the reference frequency is two frequencies sandwiching the peak frequency of the reference Brillouin gain spectrum.

5. The optical fiber characteristic measurement device according to claim 1, further comprising:
    a storage configured to store conversion information for converting the signal intensity at the reference frequency into the peak frequency of the Brillouin gain spectrum,
    wherein the measurer is configured to use the conversion information stored in the storage to obtain the peak frequency of the Brillouin gain spectrum from the signal intensity at the reference frequency acquired by the intensity acquisitor.

6. The optical fiber characteristic measurement device according to claim 1,
    wherein the intensity acquisitor is configured to acquire a first signal intensity, which is a signal intensity at the reference frequency, from a detection signal output from the first detector, and configured to acquire a second signal intensity, which is a signal intensity at the reference frequency, from a detection signal output from the second detector, and
    wherein the measurer obtains the peak frequency of the Brillouin gain spectrum from the first signal intensity and the second signal intensity acquired by the intensity acquisitor.

7. The optical fiber characteristic measurement device according to claim 1, further comprising:
    a polarization switch configured to alternately switch a polarization direction of the reference light between a first direction and a second direction perpendicular to each other,
    wherein the intensity acquisitor is configured to acquire the first signal intensity, which is a signal intensity at the reference frequency, from the detection signal output from the photodetector when the polarization direction of the reference light is switched to the first direction by the polarization switch, and configured to acquire the second signal intensity, which is a signal intensity at the reference frequency, from the detection signal output from the photodetector when the polarization direction of the reference light is switched to the second direction by the polarization switch, and
    wherein the measurer is configured to obtain the peak frequency of the Brillouin gain spectrum from the first signal intensity and the second signal intensity acquired by the intensity acquisitor.

8. The optical fiber characteristic measurement device according to claim 1, further comprising:
    a polarization scrambler configured to randomly change a polarization state of the reference light with time.

9. The optical fiber characteristic measurement device according to claim 1, further comprising:
    an optical delay part disposed between the first optical branching part and the second optical branching part and configured to delay the pump light between the first optical branching part and the second optical branching part.

10. An optical fiber characteristic measurement method comprising:
    detecting, by a photodetector, Brillouin scattered light obtained by causing light to be incident on an optical fiber;
    acquiring, by an intensity acquisitor, a signal intensity at a prescribed reference frequency from a detection signal output from the photodetector;
    measuring, by a measurer, characteristics of the optical fiber by obtaining a peak frequency of a Brillouin gain spectrum, which is a spectrum of the Brillouin scattered light, from the signal intensity at the reference frequency acquired by the intensity acquisitor;
    outputting, by a light source, frequency-modulated continuous light;
    branching, by a first optical branching part, the continuous light into pump light and reference light;
    causing, by a second optical branching part, the pump light to be incident on one end of the optical fiber; and outputting, by the second optical branching part, the Brillouin scattered light generated in the optical fiber;

wherein the photodetector comprises a first separation element, a second separation element, a first detector, and a second detector, and wherein the optical fiber characteristic measurement method further comprises:

separating, by the first separation element, the reference light into first reference light and second reference light whose polarization directions are perpendicular to each other;

separating, by the second separation element, Brillouin scattered light into first scattered light whose polarization direction is the same as that of the first reference light and second scattered light whose polarization direction is the same as that of the second reference light;

detecting, by the first detector, interference light between the first scattered light and the first reference light; and detecting, by the second detector, interference light between the second scattered light and the second reference light.

11. The optical fiber characteristic measurement method according to claim 10, wherein the reference frequency is a frequency within a frequency band of a reference Brillouin gain spectrum obtained in a state in which the optical fiber is placed under a prescribed reference environment.

12. The optical fiber characteristic measurement method according to claim 11, wherein the reference frequency is a frequency at which an inclination of the reference Brillouin gain spectrum is the largest.

13. The optical fiber characteristic measurement method according to claim 11, wherein the reference frequency is two frequencies sandwiching the peak frequency of the reference Brillouin gain spectrum.

14. The optical fiber characteristic measurement method according to claim 10, further comprising:

storing, by a storage, conversion information for converting the signal intensity at the reference frequency into the peak frequency of the Brillouin gain spectrum; and using, by the measurer, the conversion information stored in the storage to obtain the peak frequency of the Brillouin gain spectrum from the signal intensity at the reference frequency acquired by the intensity acquisitor.

15. The optical fiber characteristic measurement method according to claim 10, further comprising:

acquiring, by the intensity acquisitor, a first signal intensity, which is a signal intensity at the reference frequency, from a detection signal output from the first detector;

acquiring, by the intensity acquisitor, a second signal intensity, which is a signal intensity at the reference frequency, from a detection signal output from the second detector; and obtaining, by the measurer, the peak frequency of the Brillouin gain spectrum from the first signal intensity and the second signal intensity acquired by the intensity acquisitor.

16. The optical fiber characteristic measurement method according to claim 10, further comprising:

alternately switching, by a polarization switch, a polarization direction of the reference light between a first direction and a second direction perpendicular to each other;

acquiring, by the intensity acquisitor, the first signal intensity, which is a signal intensity at the reference frequency, from the detection signal output from the photodetector when the polarization direction of the reference light is switched to the first direction by the polarization switch;

acquiring, by the intensity acquisitor, the second signal intensity, which is a signal intensity at the reference frequency, from the detection signal output from the photodetector when the polarization direction of the reference light is switched to the second direction by the polarization switch; and obtaining, by the measurer, the peak frequency of the Brillouin gain spectrum from the first signal intensity and the second signal intensity acquired by the intensity acquisitor.

17. The optical fiber characteristic measurement method according to claim 10, further comprising:

randomly changing, by a polarization scrambler, a polarization state of the reference light with time.

18. The optical fiber characteristic measurement method according to claim 10, further comprising:

delaying the pump light by an optical delay part disposed between the first optical branching part and the second optical branching part.

* * * * *